United States Patent [19]
Yuzawa et al.

[11] Patent Number: 5,330,046
[45] Date of Patent: Jul. 19, 1994

[54] CERAMIC CONVEYOR BELT

[75] Inventors: Yukio Yuzawa; Yoshinori Yamamoto; Hiroyuki Ohira; Toshimasa Yoshizane; Nobuyuki Shibasaki, all of Kumagaya, Japan

[73] Assignee: Chichibu Cement Co., Ltd., Tokyo, Japan

[21] Appl. No.: 104,732

[22] Filed: Aug. 10, 1993

Related U.S. Application Data

[63] Continuation-in-part of Ser. No. 963,069, Oct. 19, 1992, abandoned.

[30] Foreign Application Priority Data

Oct. 23, 1991 [JP] Japan .................................. 3-275650
Mar. 31, 1992 [JP] Japan .................................. 4-76677

[51] Int. Cl.$^5$ ............................................. B65G 17/06
[52] U.S. Cl. ..................................... 198/850; 198/853
[58] Field of Search ....................... 198/850, 851, 853

[56] References Cited

U.S. PATENT DOCUMENTS

| | | | |
|---|---|---|---|
| 1,335,673 | 3/1920 | Elledge | 198/853 |
| 1,608,340 | 11/1926 | Scheidy | 198/853 |
| 2,465,929 | 3/1949 | Rixon | 198/850 |
| 3,119,276 | 1/1964 | Pearson | 198/851 |
| 3,278,000 | 10/1966 | I'Anson | 198/850 |
| 3,915,025 | 10/1975 | Poetink | 198/850 X |
| 4,159,763 | 7/1979 | Kewley et al. | 198/853 |
| 5,141,379 | 8/1992 | Wasga | 198/853 X |

FOREIGN PATENT DOCUMENTS

| | | | |
|---|---|---|---|
| 0232305 | 11/1985 | Japan | 198/850 |
| 0848428 | 7/1981 | U.S.S.R. | 198/850 |

*Primary Examiner*—James R. Bidwell
*Attorney, Agent, or Firm*—Zarley, McKee, Thomte, Voorhees & Sease

[57] ABSTRACT

The invention provides a ceramic conveyor belt assembly including a plurality of first conveyor belt parts, each comprising front and rear transverse bars and left and right longitudinal bars connecting the transverse bars, and pins located on the front and rear transverse bars and extending laterally therefrom. Further, there exists a plurality of second conveyor belt parts in the shape of a columnar member, each having a keyhole shaped so as to conform with the corresponding portion of the transverse bars. This ceramic conveyor belt is excellent in heat resistance and chemical resistance, unlikely to form rust and less likely to undergo loss in strength even at high temperature. In case some parts fail, they can be easily replaced by new parts.

1 Claim, 6 Drawing Sheets

CERAMIC CONVEYOR BELT

CROSS REFERENCE TO RELATED APPLICATION

This application is a continuation-in-part of U.S. application Ser. No. 07/963,069, filed Oct. 19, 1992, now abandoned.

TECHNICAL FIELD

This invention relates generally to a ceramic conveyor belt built up of a number of ceramic modules made of a ceramic material such as alumina, mullite, silicon carbide or the like.

BACKGROUND ART

Most conventional conveyor belts have heretofore been made of such materials as leather, cloth, rubber or metal, e.g., stainless steel.

However, conveyor belts made as of leather, cloth, or rubber are susceptible to undesirably high rate of abrasion wear and unable in the least to be employed at high temperature conditions, On the other hand it is possible that metallic belts may be used at a temperature up to 1150° C., but at temperatures higher than 1000° C., care should be given to the provision for prevention of oxidization of the metal material. In addition, not only their strength is greatly reduced, but also the rate of elongation at high temperatures is increased to an extent that their mechanical deformation or abrasion cannot be negligible.

Additional problems with metallic belts are that they are less resistant to chemicals such as acids and alkalis, inferior in chemical stability, and apt to rust.

In an attempt to overcome the aforesaid problems with the conventional conveyor belts, researches have been conducted to develop ceramic conveyor belts, and various patent applications have been made. For example, JP-A-62- 93108 (laid open for public inspection) discloses a ceramic conveyor belt comprising an endless array of ceramic links connected with each other at their front and rear ends. Each one of adjacent ceramic link is provided with a mating groove at a first end opposing a second end of the adjacent other link, said groove being open along the end edge and of an arcuate shape in cross-section having a diameter larger than the width of the opening, while the other link is provided with a mating columnar bead portion at the second end opposing the first end of the one link, said bead portion being fitted in the associated groove so that the adjacent links are interconnected pivotably relative to each other in a thickness-wise direction.

JP-A-62-153011 (laid open for public inspection) discloses another type of ceramic conveyor belt comprising ceramic link plates connected with each other by means of ceramic rollers and ceramic long joint shafts extending through the rollers, wherein a ceramic transverse split pin is inserted in a pin hole provided through each of the ceramic joint shafts adjacent one end thereof to prevent axial withdrawal of the associated joint shaft from the rollers.

It has been found that the ceramic conveyor belt disclosed in JP-A-62-93108 has a problem with respect to the strength, especially at the grooves under conditions of high temperature. Particularly, there is a problem in reliability in operation because tensile stresses are concentrated on the grooves at all times during the operation of the belt.

In addition, especially in the case of a belt having an increased width, it is not easy to replace individual belt elements. Should one or more belt parts located in the middle of the belt fail, for example, it would be required to disassemble substantially all of the belt parts one by one from the end of the conveyor belt before the damaged parts could be replaced. It is thus quite troublesome to repair the belt.

The ceramic conveyor belt disclosed in JP-A-62-153011 is likely to fail because of the long joint shafts and split pins being used. It is again not easy to replace the parts such as the link plates.

SUMMARY OF THE INVENTION

Accordingly, a primary object of the present invention is to provide a ceramic conveyor belt which is highly resistant to temperature and chemicals, will not rust, and will suffer little loss in strength at high temperatures.

Another object of the invention is to provide a ceramic conveyor belt in which the component belt parts are less liable to fail, and should they fail, they may easily be replaced by new ones.

According to one aspect of the invention, these objects are achieved by a ceramic conveyor belt assembly comprising a plurality of first ceramic belt parts and second ceramic belt parts interconnecting said first ceramic belt parts, each of the first ceramic belt parts being formed as an integral part comprising a front bar member having latch means and a rear bar member having latch means connected by connecting bar means, each of the second ceramic belt parts having catch means engageable with the respective latch means of the front and rear bar members, and said latch means being in latched engagement with the respective catch means to prevent dislodgement of the first ceramic belt parts from the second ceramic belt parts when in normal use with said first and second ceramic belt parts in their assembled state, but when the second ceramic belt parts are turned about 90° with respect to the first belt parts, said latch means being releasable from the respective catch means to permit the assembly and disassembly of the first and second ceramic belt parts.

According to another aspect of the invention, the aforesaid objects are achieved by a ceramic conveyor belt assembly comprising a number of first ceramic belt parts (8) and a number of second ceramic belt parts (9) successively interconnecting the first ceramic belt parts, each of said first ceramic belt parts (8) being formed as an integral part and having first, second, third and fourth anchor means (8a, 8b, 8c, 8d) at front left, front right, rear left and rear right locations thereof, respectively, each of said second ceramic belt parts (9) being formed as an integral part and having first, second, third and fourth catch means (9a, 9b, 9c, 9d) at front left, front right, rear left and rear right locations thereof, respectively, said anchor means (8a, 8b, 8c, 8d) and the corresponding catch means (9a, 9b, 9c, 9d) being adapted to be engageable with and disengageable from each other to assemble and disassemble the ceramic conveyor belt assembly as they are turned about 90° between first and second positions relative to each other.

It is to be appreciated that the ceramic conveyor belt constructed according to the present invention has a high resistance to temperature and chemicals, will not rust, and will suffer little loss in strength at high temperatures.

Moreover, due to the integral construction of the belt parts, stress concentrations may be avoided and the liability of the parts to break may be minimized. Should any component belt parts break, they may easily be replaced by new ones.

BRIEF DESCRIPTION OF THE DRAWINGS

These and other more detailed and specific objects and features of the present invention will be more fully disclosed in the following specification with reference to the accompanying drawings, in which.

DETAILED DESCRIPTION OF THE PREFERRED EMBODIMENTS

Referring to FIGS. 1 to 8, one embodiment of the ceramic conveyor belt according to the present invention is shown.

Figure 7:
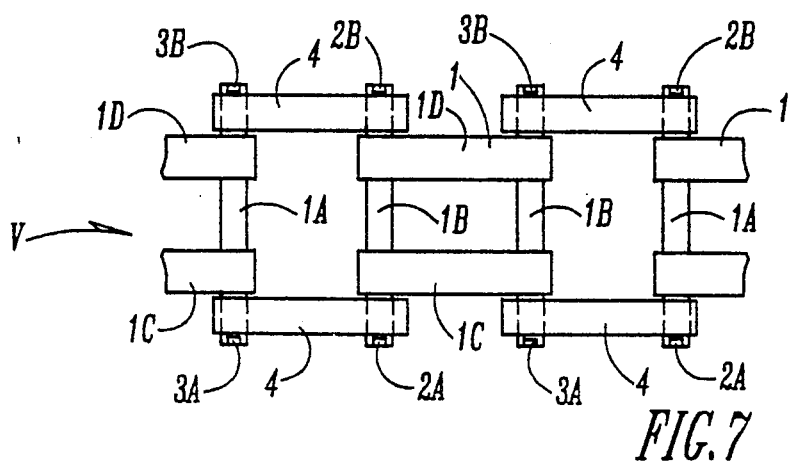
FIG. 7 is a partial plan view of a ceramic conveyor belt assembly according to this invention built up of a number of first and second belt parts connected together.

This ceramic conveyor belt V is built up of a number of first ceramic belt parts 1 and a number of second ceramic belt parts 4 interconnecting the first belt parts 1, as shown in FIG. 7. The first and second belt parts 1 and 4 are formed of a ceramic material such as alumina, mullite, silicon carbide or the like.

Figure 1:
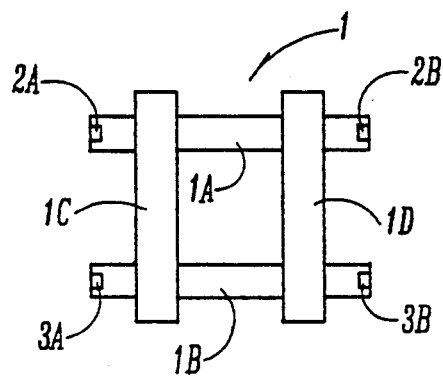
FIG. 1 is a plan view of the first belt part according to this invention.
Figure 2:
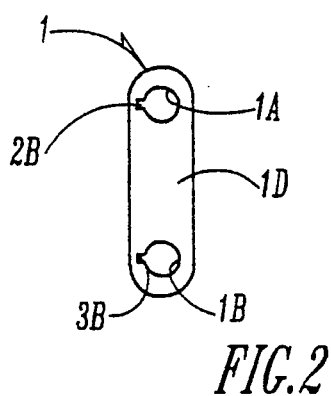
FIG. 2 is a side view of the first belt part shown in FIG. 1.

As best shown in FIGS. 1 and 2, the first ceramic belt part 1 may be made by forming and firing a ceramic material as an integral part in the shape of crossed parallel bars. More specifically, the first ceramic belt part 1 comprises front and rear transverse bar members 1a and 1b and left and right longitudinal bar members 1c and 1d connecting the transverse bar members. The front transverse bar member 1a is provided adjacent its opposite left and right ends with latch means in the form of pins 2a and 2b, respectively. Likewise, the rear transverse bar members 1b is provided adjacent its opposite left and right ends with latch means in the form of pins 3a and 3b, respectively extending laterally therefrom.

Figure 3:
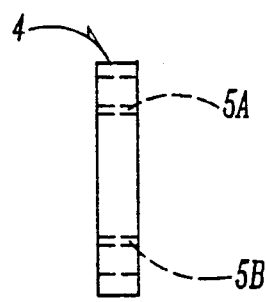
FIG. 3 is a plan view of the second belt part according to this invention.
Figure 4:
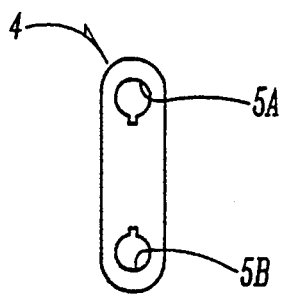
FIG. 4 is a side view of the second belt part shown in FIG. 3.

As best shown in FIGS. 3 and 4, the second ceramic belt part 4 may also be made by forming and firing a ceramic material as a single bar in the shape of a columnar member. The second ceramic belt part 4 is provided adjacent its opposite front and rear ends with catch means or throughholes in the form of key holes 5a and 5b, respectively.

Figure 5:
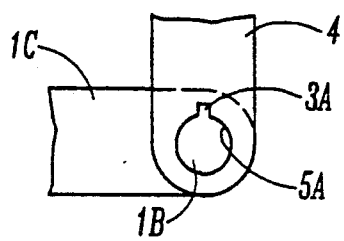
FIG. 5 is a partial side view of the first and second belt parts showing how the first and second belt parts are detachably joined together.

The key holes 5a and 5b are so shaped as to conform with the cross-section of the corresponding end portions of the transverse bar members 1b and 1a including the pins 3a, 3b and 2a, 2b, respectively when the second belt part 4 is positioned with its longitudinal axis at an angle of about 90° with respect to the plane of the first belt part 1 as shown in FIG. 5. In this position, one end of the second belt part 4 may be inserted over the end portion of one of the transverse bar members 1b and 1a of the first belt part 1 as by fitting the hole 5a of the second belt part 4 over the end portion including the pin 3a of the transverse bar member 1b and pushing the second belt part inwardly beyond the pin 3a. Then, the second belt part is turned downwardly into a longitudinal alignment with the axis of the longitudinal bar member 1c as shown in FIG. 6, whereby the first and second belt parts may be connected together in such a manner as to permit the relative pivotal movement of the first and second belt parts but to prevent the withdrawal of the second belt part from the first belt part.

One way of assembling first and second belt parts to build up the ceramic conveyor belt V according to this invention is as follows:

One second belt part 4 is positioned at an angle of about 90° relative to the plane of one first belt part 1, and then the hole 5a is fitted over one end including the pin 3a of the rear bar member 1b of said one first belt part 1 as shown in FIG. 5 until the second belt part 4 is inserted over the rear bar member 1b of the first belt part 1 beyond the pin 3a.

Figure 6:
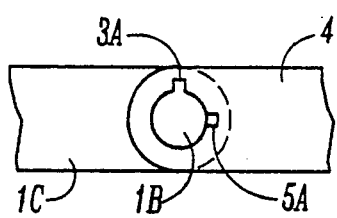
FIG. 6 is a view similar to FIG. 5 but showing the first and second belt parts being connected together in such a manner that the second belt part is prevented from being withdrawn from the first belt element.

From this state, the second belt part 4 is turned or swung down about 90° around the axis of the rear bar member 1b to a position in which the second belt part 4 is longitudinally aligned with the first belt part 1 as shown in FIG. 6 to bring the pin 3a into latching engagement with the hole 5a to thereby prevent withdrawal of the second belt part 4 from the first belt part 1.

In a like manner, the rear end of the second belt part 4 is connected to one end of the front bar member 1a of the next succeeding first belt part 1 by inserting the hole 5b over the front bar member 1a of the first belt part 1 beyond the pin 2a. Such operations are successively repeated to build up a conveyor belt having a desired length as shown in FIGS. 7 and 8.

With the construction according to this invention, it is to be appreciated that it is easy to assemble and disassemble the conveyor belt. In addition, with this construction, no stress concentration takes place on any particular location in the conveyor belt owing to the integral construction of the individual belt parts, so that the likelihood of belt parts to break is minimized. Even if some parts should break, they can be easily and quickly replaced.

Figure 8:
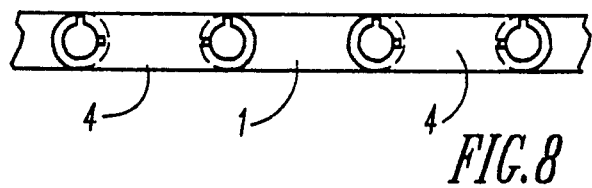
FIG. 8 is a partial side view of the ceramic conveyor belt assembly shown in FIG. 7.

As can be seen from FIGS. 7 and 8, once the conveyor belt has been assembled, there is no possibility that any second belt part 4 may be dislodged from the associated first belt part 1, since the holes 5a and 5b of the second belt part 4 are engaged with the associated ends of the rear bar member 1b and front bar member 1a of the first belt part 1 in an out-of-phase relationship with the pins 3a and 2a, respectively so that the pins 3a and 2a are in abutment with the side face of the second belt part 4.

Figure 9:
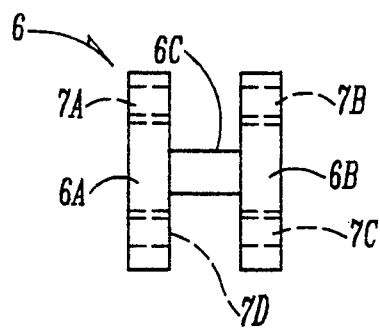
FIG. 9 is a plan view of the second belt part according to a second embodiment of this invention.
Figure 10:
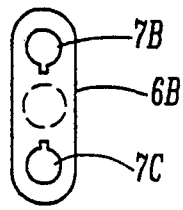
FIG. 10 is a side view of the second belt part shown in FIG. 9.
Figure 11:
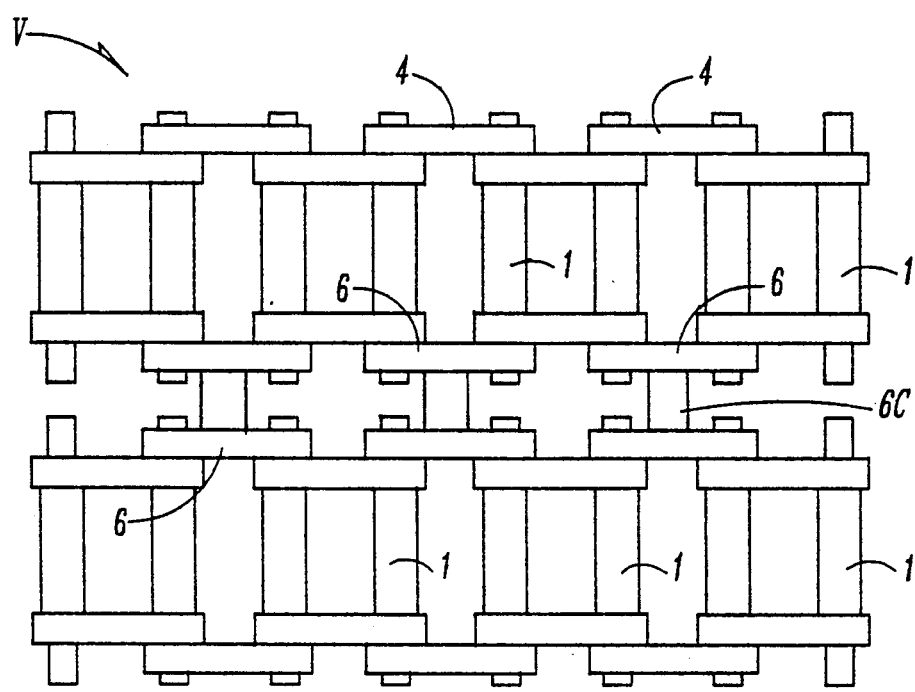
FIG. 11 is a partial plan view of a ceramic conveyor belt according to the second embodiment.
Figure 12:
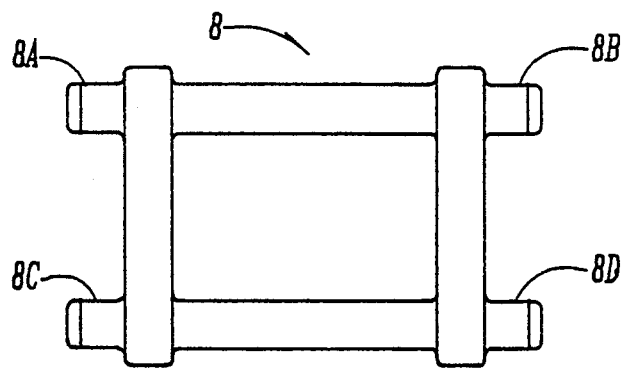
FIG. 12 is a plan view of the first belt part according to a third embodiment of this invention.
Figure 13:
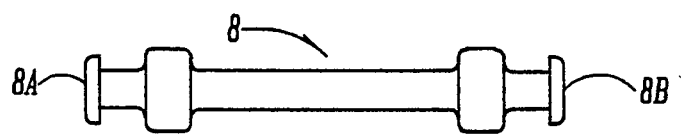
FIG. 13 is a front view of the first belt part shown in FIG. 12.
Figure 14:
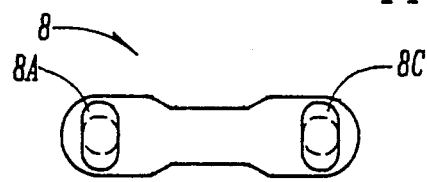
FIG. 14 is a side view of the first belt part shown in FIG. 12.

FIGS. 9 to 11 show a second embodiment of the ceramic conveyor belt according to the invention. It is to be noted that according to the first embodiment shown in FIGS. 1 to 8, nothing but a conveyor belt having a width substantially equal to that of a single first belt part 1 can be provided. In contrast, the embodiment shown in FIGS. 9 to 11 is basically different from the first embodiment in that a ceramic conveyor belt V having an increased width may be provided by arranging a desired number of first belt parts 1 in a lateral juxtaposition. By way of example, a ceramic conveyor belt V approximately twice as wide as a single first belt part 1 may be obtained when two longitudinal rows of first belt parts 1 are arranged side by side as shown in FIG. 11.

In this second embodiment, the first belt part 1 as used in the first embodiment may also be employed, but a modified second belt part 6 is used which is so constructed as to provide means for connecting laterally juxtaposed first belt parts 1 as well as longitudinally aligned first belt parts 1.

As shown in FIGS. 9 and 10, the second ceramic belt part 6 may be made by forming and firing a ceramic material such as alumina, mullite, silicon carbide or the like. Specifically, the second ceramic belt part 6 is formed as an integral part generally in the shape of H comprising a first longitudinal bar member 6a and a second longitudinal bar member 6b interconnected by a connecting bar member 6c. The first longitudinal bar member 6a has front and rear catch means in the form of key holes 7a and 7d, respectively similar to the key holes 5a and 5b in the belt part 4 of the first embodiment, as does the second longitudinal bar member 6b have front and rear catch means in the form of key holes 7b and 7c, respectively.

The rest of construction of the second embodiment is substantially similar to that of the first embodiment, and need not be further described. It would be sufficient to state that the front and rear holes 7a, 7d of the first longitudinal bar member 6a of each one of the second ceramic belt parts 6 are engaged with the pin 3b of corresponding one of the first ceramic belt parts 1 and the second pin 2b of the next succeeding first ceramic belt part 1, respectively while the front and rear holes 7b, 7c of the second longitudinal bar member 6b of said one of the second ceramic belt parts 6 are engaged with the pin 3a of another first ceramic belt part 1 laterally adjoining said one first ceramic belt part and the pin 2a of still another first ceramic belt part 1 succeeding said another first ceramic belt part, respectively. Those pins 3b, 2b, 3a, 2a are not shown in FIG. 11.

The configurations of the first and second belt parts 1, 4, 6 and the holes 5a, 5b, 7a, 7b, 7c and 7d are not limited to those illustrated and various configurations may be envisaged within the scope of the invention.

FIGS. 12 to 20 show a third embodiment of the ceramic conveyor belt according to the invention.

This embodiment is similar to but different from the second embodiment shown in FIGS. 9 to 11 in that the front and rear transverse bar members and of the first integral ceramic belt part 1 are formed at the opposite ends thereof with enlarged generally elliptical or oblong bosses 8a, 8b; 8c, 8d as anchor means instead of the pins 2a, 2b; 3a, 3b in the first and second embodiments, and that the second integral ceramic belt part 9, which is an H-shaped member fundamentally identical to the second belt part 6 in the second embodiment, has catch means in the form of generally elliptical or oblong holes 9a, 9c and 9b, 9d formed through the fore and rear ends of the two longitudinal bar members instead of the key holes 7a, 7b, 7c, 7d in the second embodiment. The elliptical or oblong holes 9a, 9c and 9b, 9d are complementarily shaped so as to receive and permit passage therethrough of the elliptical or oblong bosses 8a, 8b, 8c, 8d, of the first belt part 8 when the second belt part 9 is positioned with its longitudinal axis at an angle of about 90° with respect to the plane of the first belt part 8. When the second belt part 9 is turned downwardly into a longitudinal alignment with the axis of the longitudinal bar members of the first belt part, the elliptical or oblong boss is brought into latching engagement with the corresponding elliptical or oblong hole to thereby prevent the withdrawal of the second belt part from the first belt part.

The rest of construction of the third embodiment is substantially similar to that of the second embodiment except for the diameter and configuration of the anchor portion and the catch means carrying portion, and need not be further described.

Figure 19:
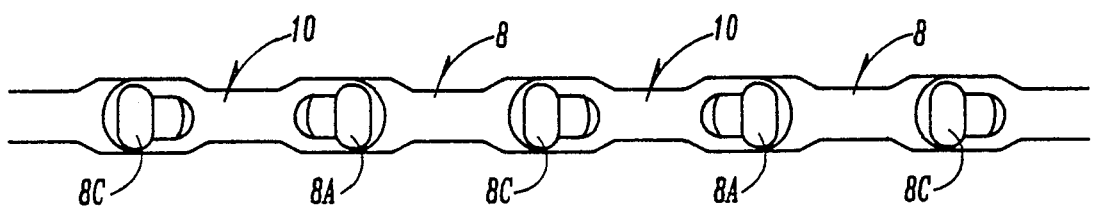
FIG. 19 is a partial side view of a ceramic conveyor belt assembly according to the third embodiment of the invention.
Figure 20:
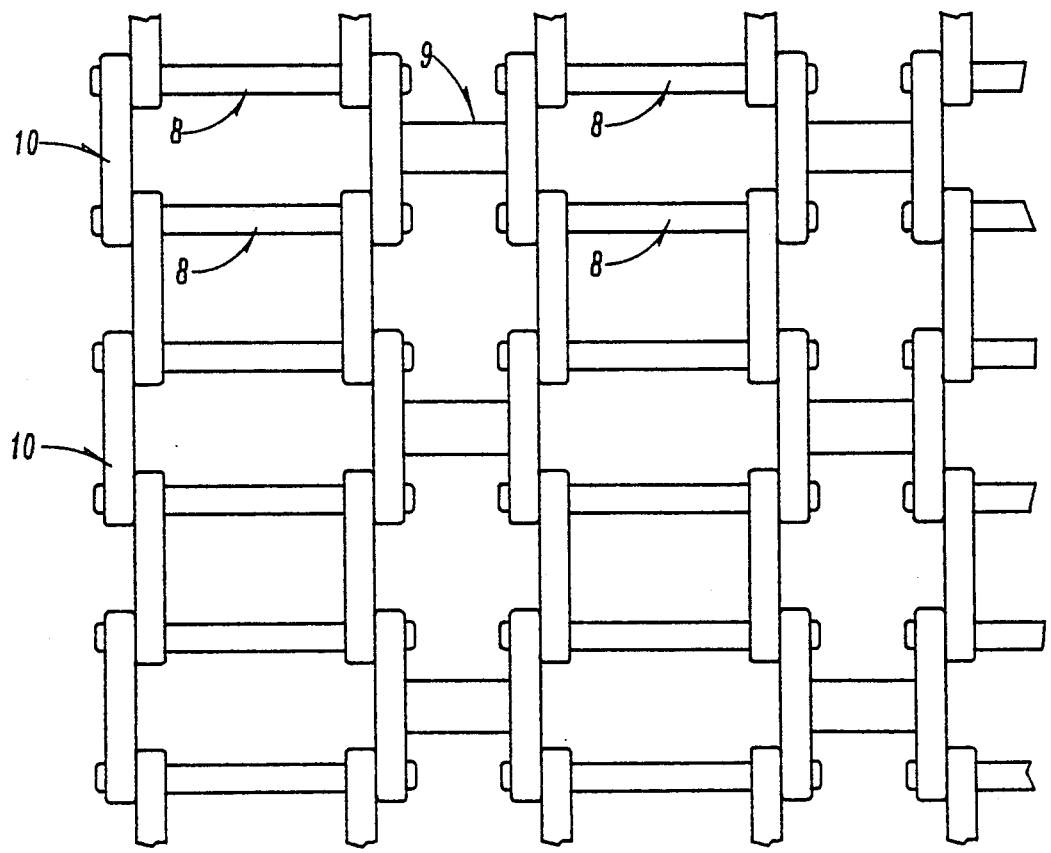
FIG. 20 is a partial plan view of the ceramic conveyor belt assembly shown in FIG. 19.

A desired number of first and second belt parts 8 and 9 according to the third embodiment may be assembled in the similar manner as described hereinabove in connection with the second embodiment to build up a ceramic conveyor belt having a desired width and length as shown in FIGS. 19 and 20.

Figure 15:
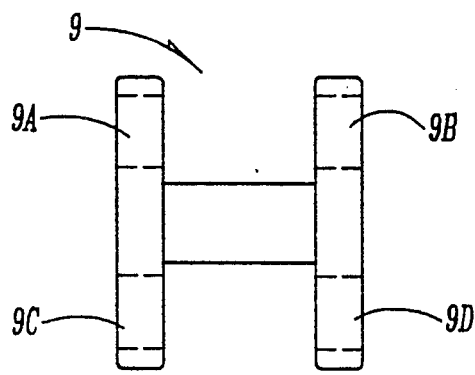
FIG. 15 is a plan view of the second belt part according to the third embodiment of this invention.
Figure 16:
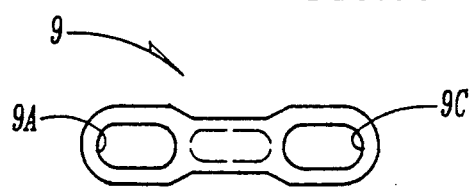
FIG. 16 is a side view of the second belt part shown in FIG. 15.
Figure 17:
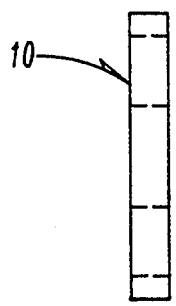
FIG. 17 is a plan view of the auxiliary belt part according to the third embodiment of this invention.
Figure 18:
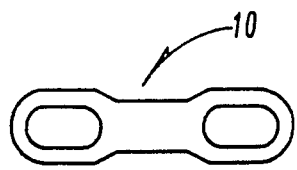
FIG. 18 is a side view of the auxiliary belt part shown in FIG. 17.

H-shaped second belt parts 9 as shown in FIGS. 15 and 16 may be used to line the outermost sides of conveyor belt assembly. However, to this end it may be preferable to use auxiliary belt parts 10 as shown in FIGS. 17 to 20. The auxiliary belt part 10 is in the form of a single bar as member having elliptical or oblong holes formed therethrough adjacent its fore and rear ends, said elliptical or oblong holes being of the same shape as the elliptical or oblong holes 9a, 9c and 9b, 9d of the second belt part 9 to receive the complementary elliptical or oblong bosses 8a, 8b, 8c, 8d, of the first belt part 8.

As is described hereinabove, the present invention provides a conveyor belt assembly which is highly resistant to temperature and chemicals, will not rust, and will suffer little loss in strength even at high temperatures.

In addition, due to the integral construction of the belt parts on which substantially no stress concentrations may take place, the liability of the parts to break may be minimized. Should any component belt parts break, they may easily be replaced by new ones.

Each of the belt parts is formed into its finished part shape during the forming or molding process, rather than being constituted by combining bar members by means of connectors or joints and others. With this integral construction, it is possible to form the belt part of such a shape that stress concentrations may be avoided, whereby the reliability of the parts may be greatly enhanced. Further, the number of component parts required may also be reduced, thereby facilitating the assembly and disassembly of the conveyor belt.

The latch mechanism comprising the latch means and catch means which is an important feature of the invention permits ready assembly and disassembly of the first and second belt parts simply by turning the parts about 90° relative to each other without the need for using some kind of tools or adhesives, and in addition permits repeated uses of the same belt parts.

According to the present invention the individual first and ceramic belt parts are each formed with its own latch means or catch means, whereby loads on the conveyor belt assembly are not concentrated on any single part, but are distributed uniformly on the belt.

The present invention provides more reliable conveyor belts by eliminating the use of long connecting rods, and also achieves the purpose of reducing the number of belt components required owing to this feature.

Each of the ceramic conveyor belt parts according to the present invention is formed with a releasable latch mechanism comprising latch means and catch means, which makes it possible to readily build up different sizes of conveyor belts simply by combining any desired number of first and second belt parts.

In the present invention, in order to change the width of the belt, as many belt parts as required may be disassembled and then reused to reassemble the belt into a desired width, so that the belt parts may be more effectively utilized.

The above description is included to illustrate the preferred embodiments of the invention and is not meant to limit the scope of the invention. From the above discussion, many variations will be apparent to one skilled in the art that would yet be encompassed by the spirit and the scope of the invention.

What is claimed is:

1. A ceramic conveyor belt assembly comprising a number of first ceramic belt parts (8) and a number of second ceramic belt parts (9) successively interconnecting the first ceramic belt parts,
    each of said first ceramic belt parts (8) being formed as an integral part and having first, second, third and fourth anchor means (8a, 8b, 8c, 8d) at front left, front right, rear left and rear right locations thereof, respectively,
    each of said second ceramic belt parts (9) being formed as an integral part and having first, second, third and fourth catch means (9a, 9b, 9c, 9d) at front left, front right, rear left and rear right locations thereof, respectively,
    said anchor means (8a, 8b, 8c, 8d) and the corresponding catch means (9a, 9b, 9c, 9d) being adapted to be engageable with and disengageable from each other to assemble and disassemble the ceramic conveyor belt assembly as they are turned about 90° between first and second positions relative to each other.

* * * * *